United States Patent
Favey et al.

(10) Patent No.: US 7,254,723 B1
(45) Date of Patent: Aug. 7, 2007

(54) METHOD AND APPARATUS FOR MANAGING CURRENT CONSUMPTION

(75) Inventors: Hugues Favey, Fremont, CA (US); Paul Loughnane, Newark, CA (US)

(73) Assignee: Logitech Europe S.A. (CH)

( * ) Notice: Subject to any disclaimer, the term of this patent is extended or adjusted under 35 U.S.C. 154(b) by 233 days.

(21) Appl. No.: 10/641,990

(22) Filed: Aug. 15, 2003

Related U.S. Application Data

(60) Provisional application No. 60/404,059, filed on Aug. 16, 2002.

(51) Int. Cl.
G06F 1/00 (2006.01)
G06F 1/32 (2006.01)

(52) U.S. Cl. ...................... 713/300; 713/320
(58) Field of Classification Search ............... None
See application file for complete search history.

(56) References Cited

U.S. PATENT DOCUMENTS

| | | | |
|---|---|---|---|
| 6,578,152 B1 * | 6/2003 | Burnside | 713/300 |
| 6,946,817 B2 * | 9/2005 | Fischer et al. | 320/132 |
| 2004/0103326 A1 * | 5/2004 | Hirst et al. | 713/300 |

* cited by examiner

Primary Examiner—A. Elamin
Assistant Examiner—Stefan Stoynov
(74) Attorney, Agent, or Firm—Townsend and Townsend and Crew LLP

(57) ABSTRACT

Embodiments of the present invention are directed to methods and apparatus for managing current consumption of a peripheral device to meet power specification of the host system having a preset average current supply limit, a preset peak current supply limit, or both. In specific embodiments, the host system has a current supply limit available for supplying current to the peripheral device. The peripheral device operates in a low current consumption mode and a peak current consumption mode which is intermittent over time. The peripheral device draws a low current in the low current consumption mode which is lower than the current supply limit and drawing a peak current in the peak current consumption mode which is higher than the current supply limit. The apparatus comprises a reservoir configured to store excess energy from the host system during the low current consumption mode where the low current drawn by the peripheral device is lower than the current supply limit available from the host system. A switch is configured to direct the excess energy from the host system to the reservoir for storage during the low current consumption mode of the peripheral device and to allow energy to be drawn from the reservoir to operate the peripheral device in the peak current consumption mode.

18 Claims, 3 Drawing Sheets

METHOD AND APPARATUS FOR MANAGING CURRENT CONSUMPTION

CROSS-REFERENCES TO RELATED APPLICATIONS

This application is based on and claims the benefit of U.S. Provisional Patent Application No. 60/404,059, filed Aug. 16, 2002, the entire disclosure of which is incorporated herein by reference.

BACKGROUND OF THE INVENTION

This invention relates generally to managing power consumption and, more particularly, to methods and apparatus for providing sufficient current to meet the consumption by one or more devices without exceeding preset limitations of average current and peak current supply from a power supply.

In certain systems, it is desirable to have a power specification which requires that a device coupled thereto should not draw more current from the current supply than a preset limit. This preset limit can be an average current limit, a peak current limit, or both an average current limit and a peak current limit. Such a power specification may be provided for reasons of reliability, performance, or the like. For example, a host system may have a peripheral device such as an RF transmitter operatively coupled therewith for wireless transmission of data between the host system and a remote RF device. The RF transmission is intermittent over time. The RF transmitter may have a current consumption of about 80 mA during transmission, and a current consumption of about 3 mA when no transmission is occurring. If the peak current supply limit for the host system is less than 80 mA, the RF transmitter does not meet the peak current limit. If the average current supply limit of the host system is sufficiently low (e.g., about 20 mA), the average current consumption of the RF transmitter may exceed the average current supply limit.

BRIEF SUMMARY OF THE INVENTION

Embodiments of the present invention are directed to methods and apparatus for managing current consumption of a peripheral device to meet power specification of the host system having a preset average current supply limit, a preset peak current supply limit, or both. The peripheral device includes a current consumption waveform having intermittent peaks separated by low current consumption regions. Such a peripheral device may be used intermittently to provide an RF transmission, drive a motor, or the like. Examples of such peripheral devices include an RF transmitter, a scanner, and an input device having a motor to be driven intermittently.

In specific embodiments, the invention provides a mechanism to store as much energy in the form of current or electrical charges as is allowed by the system specification while the peripheral device is not in the peak current consumption mode but in the low current consumption mode. When sufficient current is stored in the reservoir such as a capacitor, the peripheral device may be switched to the peak current consumption mode by drawing current from the reservoir instead of from the host system. As a result, the host system does not experience the peak current consumption required by the peripheral device. When the peripheral device is switched from the peak current consumption mode back to the low current consumption mode, current is once again accumulated and stored in the reservoir for the next peak current consumption cycle.

An aspect of the present invention is directed to an apparatus for managing current consumption of a peripheral device coupled with a host system. The host system has a current supply limit available for supplying current to the peripheral device. The peripheral device operates in a low current consumption mode and a peak current consumption mode which is intermittent over time. The peripheral device draws a low current in the low current consumption mode which is lower than the current supply limit and drawing a peak current in the peak current consumption mode which is higher than the current supply limit. The apparatus comprises a reservoir configured to store excess energy from the host system during the low current consumption mode where the low current drawn by the peripheral device is lower than the current supply limit available from the host system. A switch is configured to direct the excess energy from the host system to the reservoir for storage during the low current consumption mode of the peripheral device and to allow energy to be drawn from the reservoir to operate the peripheral device in the peak current consumption mode.

In some embodiments, a sensing element configured to sense whether the peripheral device is operating in the low current consumption mode or in the peak current consumption mode. The sensing element may comprise a current sense resistor. The reservoir comprises at least one capacitor. The energy is allowed to be drawn from the reservoir to operate the peripheral device in the peak current consumption mode only after sufficient energy is stored in the reservoir to supplement the current supply limit available from the host system to meet the peak current of the peripheral device in the peak current consumption mode.

In specific embodiments, the current supply limit of the host system is one of a peak current supply limit and an average current supply limit. The current supply limit may be a peak current supply limit which may be equal to an average current supply limit. The switch is configured to switch between the low current consumption mode and the peak current consumption mode according to a preset period. Sufficient time is provided in the low current consumption mode to store adequate energy in the reservoir to operate the peripheral device in the peak current consumption mode.

In accordance with another aspect of the invention, a method of managing current consumption of a peripheral device coupled with a host system comprises storing excess energy from the host system in a reservoir during the low current consumption mode where the low current drawn by the peripheral device is lower than the current supply limit available from the host system. The excess energy is directed from the host system to the reservoir for storage during the low current consumption mode of the peripheral device. The energy is allowed to be drawn from the reservoir to operate the peripheral device in the peak current consumption mode without drawing current from the host system exceeding the current supply limit.

In some embodiments, the method further comprises sensing whether peripheral device is operating in the low current consumption mode or in the peak current consumption mode. This may include sensing a current being drawn from the peripheral device and determining that the peripheral device is in the low current consumption mode if the sensed current is below the current supply limit and that the peripheral device is in the peak current consumption mode if the sensed current is above the current supply limit.

In accordance with another aspect of the present invention, a current consumption management system for managing current supplied from a host system comprises a peripheral device configured to draw current from the host system having a current supply limit available to the peripheral device. The peripheral device operates in a low current consumption mode and a peak current consumption mode which is intermittent over time. The peripheral device draws a low current in the low current consumption mode which is lower than the current supply limit and drawing a peak current in the peak current consumption mode which is higher than the current supply limit. A current consumption management module is configured to be coupled with the peripheral device and the host system. The current consumption management module is configured to store excess energy from the host system during the low current consumption mode where the low current drawn by the peripheral device is lower than the current supply limit available from the host system, and to allow energy to be drawn from the reservoir to operate the peripheral device in the peak current consumption mode without drawing current from the host system exceeding the current supply limit.

DETAILED DESCRIPTION OF THE INVENTION

Figure 1:
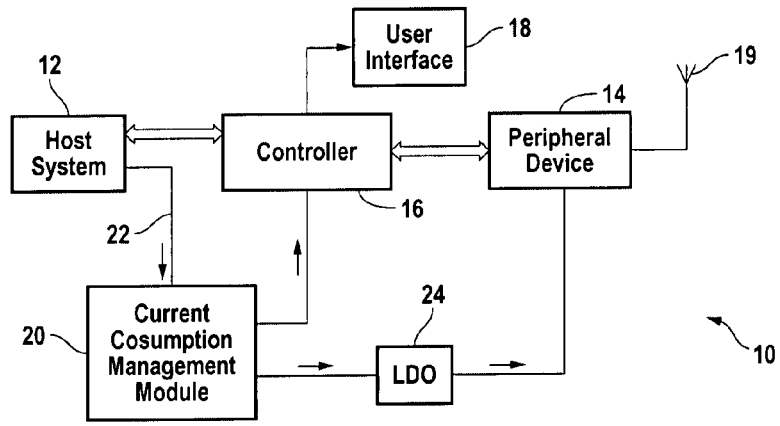
FIG. 1 is a simplified block diagram schematically illustrating a system incorporating the current consumption management module according to an embodiment of the present invention.

FIG. 1 shows a block diagram of a system 10 which incorporates a current consumption management scheme according to an embodiment of the invention. A host system 12 and a peripheral device 14 are in communication with a controller 16, which is coupled to a user interface 18, which may be an indicator or a control component such as a button LED. The peripheral device 14 may be an RF transmitter with an antenna 19. The host system 12 supplies a voltage to the peripheral device 14 and the controller 16 through a power management module or current consumption management module 20 via supply line 22. In one example, the supply voltage is about 3.5 V. A low dropout (LDO) regulator 24 is provided between the current consumption management module 20 and the peripheral device 14 to regulate the output voltage to the peripheral device 14 to achieve a target output voltage. In one example, the target output voltage is about 3 V. The host system may be, for example, a PC or a game console such as a Sony Playstation, a Nintendo Gamecube, a Microsoft Xbox, or the like.

Figure 2:
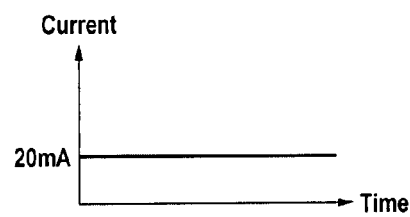
FIG. 2 shows a current supply waveform for the host system in FIG. 1 according to an embodiment of the present invention.
Figure 3:
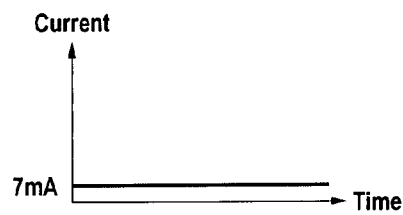
FIG. 3 shows a current consumption waveform for the controller in FIG. 1 according to an embodiment of the present invention.
Figure 4:
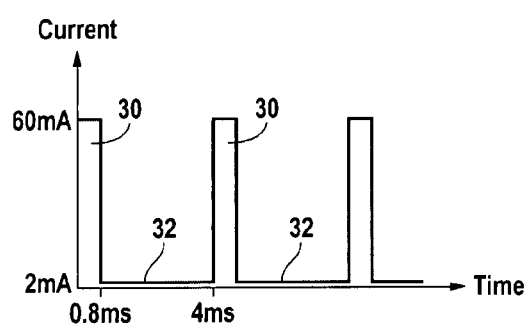
FIG. 4 shows a current consumption waveform for the peripheral device in FIG. 1 according to an embodiment of the present invention.

As shown in FIG. 2, the desired current supply waveform for the host system 12 is set at a generally constant level. For example, the host system supply current is about 20 mA. The current is primarily consumed by the peripheral device 14 and the controller 16. FIG. 3 shows the current consumption waveform for the controller 16 which may be substantially constant. For example, the controller current consumption current is about 7 mA. In FIG. 4, the current consumption for the peripheral device 14 has intermittent peak consumption regions 30 separated by low consumption regions 32. Such a peripheral device 14 may be used intermittently to provide an RF transmission, to drive a motor, or the like. The peak current in the peak current consumption regions 30 is higher, typically substantially higher, than the host system supply current, while the low current in the low current consumption regions 32 is lower than the host system supply current. The duration of the peak current consumption region 30 is typically substantially less than the duration of the low current consumption region 32. In one example, the peak current is about 60 mA and the peak current duration is about 0.8 ms, while the low current is about 2 mA and the low current duration is about 3.2 ms. In some cases, the current consumption waveform for the peripheral device 14 is periodic, with a period of about 4 ms in the specific example. The current consumption waveform cycle for the peripheral device 14 may be controlled by a clock (e.g., a clock provided in the controller 16). In other cases, the current consumption waveform for the peripheral device 14 does not have a fixed period, but instead has a variable period.

The current consumption management module 20 manages the current flow to the peripheral device 14 to meet the power specification of the host system 12. The host system 12 can supply an average current and also has a limit current. In this example, the average current and the limit current are equal to a fixed value (e.g., 20 mA). The current consumption management module 20 provides a mechanism to store as much energy in the form of electrical charges (in Coulomb) as is allowed by the system specification while the peripheral device 14 is in the low current consumption mode. When sufficient current is stored in a reservoir, the peripheral device 14 may be switched to the peak current consumption mode by drawing current from the reservoir to supplement the current available from the host system to meet the peak current requirement of the peripheral device 14. As a result, the host system does not experience the peak current consumption required by the peripheral device. When the peripheral device 14 is switched from the peak current consumption mode back to the low current consumption mode, current is once again accumulated and stored in the reservoir for the next peak current consumption cycle.

Figure 5:
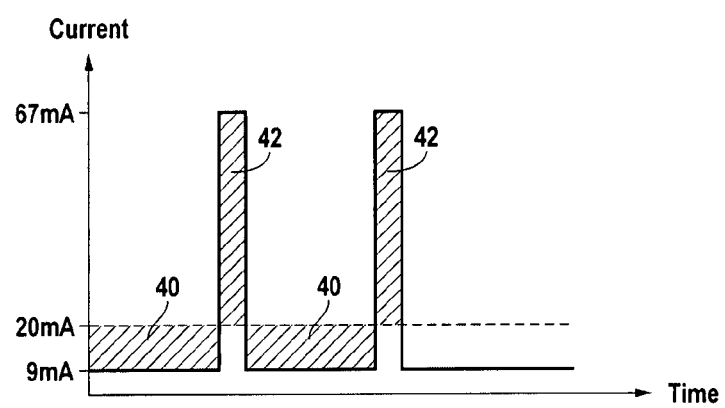
FIG. 5 shows a combined current consumption waveform for the controller and the peripheral device.

FIG. 5 shows a combined current waveform for the controller 16 and the peripheral device 14. The peak current consumption is about 67 mA, while the low current consumption is about 9 mA. The host system current supply is 20 mA. During the low current consumption mode, the excess current indicated by region 40 is stored in a reservoir in the current consumption management module 20. The stored current 40 is used to supplement the 20 mA supply in the peak current consumption mode, as indicated by the region 42. The amount of excess current accumulated over time and available in the region 40 should be at least as much as the amount of supplemental current required in the region 42 for peak consumption. This can be controlled by a clock (e.g., a clock provided in the controller 16) which may set a fixed period for the peripheral device waveform. In other cases, the current consumption waveform for the peripheral device 14 has a variable period. In that case, the current consumption management scheme still works as long as sufficient time is provided during the low current consumption mode to store sufficient excess current in the region 40 to provide the supplemental current required to meet the peak consumption current level in the region 42.

Figure 6:
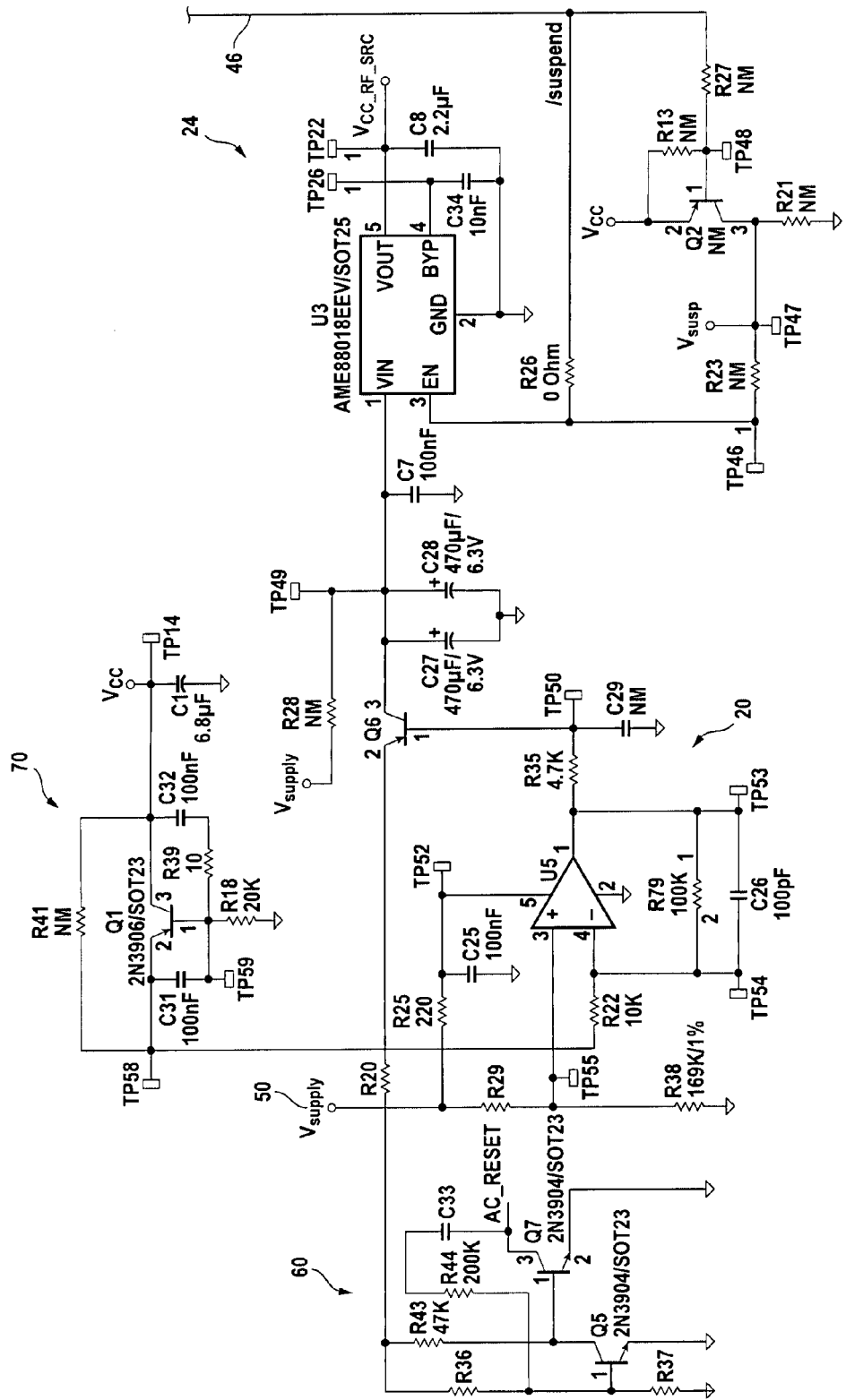
FIG. 6 is an exemplary circuit schematic of the current consumption management module and low dropout regulator in the system of FIG. 1 according to an embodiment of the present invention.

An exemplary embodiment of the circuit for implementing the current consumption management scheme is illustrated in FIG. 6, which shows the current consumption management module 20 and low dropout regulator 24. A control line 46 connects the low dropout regulator 24 of FIG. 6 with the controller 16.

As shown in FIG. 6, the supply voltage enters the current consumption management module 20 as $V_{supply}$ at an entry point 50. Reference resistors R29 and R38 form a resistor bridge to set a threshold current. The threshold current is the upper limit of the current permissible to be drawn from the host system 12 through the entry point 50. A current sense resistor R20 is used to sense the current in the current consumption management module 20. As long as the sensed current is below the threshold current, the operational amplifier U5 keeps the passing transistor Q6 in a servo-controlled closed position to draw an amount of current within the power specification of the host system 12 to the capacitors C27, C28 to charge those capacitors. The peripheral device 14 is in the low current consumption mode, and the excess current indicated by region 40 of FIG. 5 is stored in the capacitors C27, C28. Of course, the number of capacitors may vary. When the current sensed by the current sense resistor R20 exceeds the threshold current, the peripheral device 14 is in the peak current consumption mode. The operational amplifier U5 causes the passing transistor Q6 to switch to a servo-controlled open position. The current needed to operate the peripheral device 14 in the peak current consumption mode is supplemented by the current stored in the capacitors C27, C28. Upon completion of operating the peripheral device 14 in the peak current consumption mode, the operational amplifier U5 switches the passing transistor Q6 back to the servo-controlled closed position to charge the capacitors C27, C28 in the low current consumption mode.

In the current consumption management module 20, the resistor R25 and the capacitor C25 form an RC filter to supply current to the operational amplifier U5. The resistors R22 and R79 and the capacitor C26 form the negative feedback necessary for the operational amplifier U5 to work in a linear mode and to properly servo-control the passing transistor Q6. The circuit as shown represents a typical implementation of a current source.

In the exemplary embodiment, the components including the operational amplifier U5 and passing transistor Q6 serve as a switch to direct the excess energy from the host system to the reservoir for storage during the low current consumption mode of the peripheral device and to allow energy to be drawn from the reservoir to operate the peripheral device in the peak current consumption mode. The "switch" is not an on/off switch. Instead, the "switch" is a tap that is servo-controlled to switch the passing transistor Q6 between the servo-controlled closed position (to allow the current to charge the capacitors C27, C28 when the peripheral device 14 is operating in the low current consumption mode) and the servo-controlled open position (to allow the energy stored in the capacitors C27, C28 to be used to supplement the current available from the host system 12 to operate the peripheral device 14 in the peak current consumption mode). The "switch" or tap regulates itself between the two positions so that the current sensed by the sense resistor R20 does not exceed the maximum host system current supply (e.g., 20 mA). Of course, other types of switches may be used in different embodiments to control operation of the system between the low current consumption mode and peak current consumption mode of the peripheral device.

In the embodiment shown in FIG. 6, a reset circuitry 60 is connected to the current consumption management module 20 to ensure the correct starts of the microcontroller section 16 (see FIG. 1), as the residual voltage held on the capacitors C27 and C28 after the power has been removed can cause some interferences with the correct behavior of the microcontroller 16. An in-rush current circuit 70 is connected to the current consumption management module 20 to limit the amount of current taken at power up and to bring it down to a standardized limit which is dependent on the host system 12. The low dropout (LDO) regulator 24 is provided between the current consumption management module 20 and the peripheral device 14 to regulate the output voltage to the peripheral device 14 to achieve a target voltage. In one example, the target output voltage is about 3 V.

When the peripheral device 14 is operating in the low current consumption mode, a substantial amount of current can be stored in the reservoir capacitors C27, C28. When the peripheral device 14 is in the peak current consumption mode, less current can be stored but there is still some current available. The operational amplifier U5 and the sense resistor R20 in the current consumption management module 20 are used to determine what amount of current is available and to direct the current flow for storage in the reservoir capacitors C27, C28. The number of charges Q in Coulomb [Cb] accumulated during a certain time t in seconds [s] by a certain current I in amps [A] is:

$$Q[Cb]=I[A]*t[s].$$

The total charge the host system will supply is:

$$Q_{max}=I_{host}*T.$$

In a specific example, $$Q_{max}=20\ mA*4\ ms=80\ \mu Cb(\text{micro-Coulomb}).$$

The number of charges required by the application is:

$$Q_{app}=Q_{rf}+Q_{\mu c},$$

where $Q_{rf}$ is the charge for the RF peripheral device and $Q_{\mu c}$ is the charge for the microprocessor. In the specific example, $$Q_{rf}=60\ mA*0.8\ ms+2\ mA*(4\ ms-0.8\ ms)=54.4\ \mu Cb,$$

$$Q_{\mu c}=6\ mA*4\ ms=24\ \mu Cb,$$

$$Q_{app}=78.4\ \mu Cb.$$

This shows that the host system 12 will supply enough charges to the entire device, and that the overall system is feasible.

The voltage after passing through the LDO 24 of FIG. 1 is about 3 V. To ensure the system works properly, some overhead of about 0.15 V is needed. The capacity of the reservoir is chosen to be sufficiently large so that the LDO 24 will still maintain a correct regulation taking into account some variation in the voltage supply of the host system 12 and some voltage drops in the components forming the current source, especially R20 and Q6 (typical loss of about 80 mV). The lowest voltage the host system 12 will provide is about 3.3 V. The capacity of the reservoir is then given by:

$$C_{res}=Q_{rf}/\Delta U=54.4\ \mu Cb/(3.3-3.15-\text{losses})V=54.4\ \mu Cb/70\ mV=777\ \mu F(\text{micro-Farad}).$$

The actual values fitted are 2*470 µF for the reservoir capacitors C27, C28, which bring the total capacitance to about 940 µF with components tolerance.

When one plugs in the peripheral device 14, the system needs time for there to be enough energy stored in the reservoir. The minimum time is given by the charging time of the capacitors through the current source of 20 mA. The current is:

$$i = C*(\Delta V/\Delta t),$$

$$\Delta t = C*\Delta V/i.$$

In the specific example, the minimum time is $$\Delta t = 940 \; \mu F*(3.3 \; V/20 \; mA) = 155 \; ms.$$

The above-described arrangements of apparatus and methods are merely illustrative of applications of the principles of this invention and many other embodiments and modifications may be made without departing from the spirit and scope of the invention as defined in the claims. For instance, the reservoir capacitors C27, C28 may be replaced by other current storage components such as rechargeable batteries or gold cap devices. The components around the operational amplifier U5, the transistor Q6, the sense resistor R20, the bridge divider R29 and R38, and the negative feedback network R22, R79, and C26 form a typical current source that charges the reservoir formed with the capacitors C27 and C28. There exist many different ways of implementing a current source, for example, by using discrete components such as transistors and diodes or by employing a switching scheme with the addition of an inductor and switching elements (e.g., MOSFET transistors and switching controller). The scope of the invention should, therefore, be determined not with reference to the above description, but instead should be determined with reference to the appended claims along with their full scope of equivalents.

What is claimed is:

1. An apparatus for managing current consumption of a peripheral device coupled with a host system, the host system having a current supply limit available for supplying current to the peripheral device, the peripheral device operating in a low current consumption mode and a peak current consumption mode which is intermittent over time, the peripheral device drawing a low current in the low current consumption mode which is lower than the current supply limit and drawing a peak current in the peak current consumption mode which is higher than the current supply limit, the apparatus comprising:

a reservoir configured to store excess energy from the host system during the low current consumption mode where the low current drawn by the peripheral device is lower than the current supply limit available from the host system;

a sensing element configured to sense whether the peripheral device is operating in the low current consumption mode or in the peak current consumption mode;

an amplifier coupled to the sensing element and configured to receive a signal from the sensing element wherein the signal indicates whether the peripheral device is in the low current consumption mode or in the peak current consumption mode; and a switch coupled to the amplifier and configured to be switched by the amplifier to direct the excess energy from the host system to the reservoir for storage during the low current consumption mode of the peripheral device and to allow energy to be drawn from the reservoir to operate the peripheral device in the peak current consumption mode.

2. The apparatus of claim 1 wherein the sensing element comprises a current sense resistor.

3. The apparatus of claim 1 wherein the reservoir comprises at least one capacitor.

4. The apparatus of claim 1 wherein the energy is allowed to be drawn from the reservoir to operate the peripheral device in the peak current consumption mode only after sufficient energy is stored in the reservoir to supplement the current supply limit available from the host system to meet the peak current of the peripheral device in the peak current consumption mode.

5. The apparatus of claim 1 wherein the current supply limit of the host system is one of a peak current supply limit and an average current supply limit.

6. The apparatus of claim 1 wherein the current supply limit is a peak current supply limit which is equal to an average current supply limit.

7. The apparatus of claim 1 wherein the switch is configured to switch between the low current consumption mode and the peak current consumption mode according to a preset period, and wherein sufficient time is provided in the low current consumption mode to store adequate energy in the reservoir to operate the peripheral device in the peak current consumption mode.

8. A method of managing current consumption of a peripheral device coupled with a host system, the host system having a current supply limit available for supplying current to the peripheral device, the peripheral device operating in a low current consumption mode and a peak current consumption mode which is intermittent over time, the peripheral device drawing a low current in the low current consumption mode which is lower than the current supply limit and drawing a peak current in the peak current consumption mode which is higher than the current supply limit, the method comprising:

sensing the current drawn by the peripheral device to determine whether the peripheral device is in the low current consumption mode or the peak current consumption mode;

amplifying a signal generated in the sensing step;

based on the amplifying step and the sensing step, storing excess energy from the host system in a reservoir during the low current consumption mode where the low current drawn by the peripheral device is lower than the current supply limit available from the host system;

based on the amplifying step and the sensing step, directing, via a switch, the excess energy from the host system to the reservoir for storage during the low current consumption mode of the peripheral device; and allowing, via the switch, energy to be drawn from the reservoir to operate the peripheral device in the peak current consumption mode without drawing current from the host system exceeding the current supply limit.

9. The method of claim 8 wherein sensing the consumption mode comprises sensing a current being drawn from the peripheral device and determining that the peripheral device is in the low current consumption mode if the sensed current is below the current supply limit and that the peripheral device is in the peak current consumption mode if the sensed current is above the current supply limit.

10. The method of claim 8 wherein the energy is allowed to be drawn from the reservoir to operate the peripheral device in the peak current consumption mode only after sufficient energy is stored in the reservoir to supplement the current supply limit available from the host system to meet the peak current of the peripheral device in the peak current consumption mode.

11. The method of claim 8 wherein the current supply limit of the host system is one of a peak current supply limit and an average current supply limit.

12. The method of claim 8 wherein the current supply limit is a peak current supply limit which is equal to an average current supply limit.

13. The method of claim 8 further comprising switching the peripheral device between the low current consumption mode and the peak current consumption mode; and providing sufficient time in the low current consumption mode to store adequate energy in the reservoir to operate the peripheral device in the peak current consumption mode.

14. A current consumption management system for managing current supplied from a host system, the system comprising:
- a peripheral device configured to draw current from the host system having a current supply limit available to the peripheral device, the peripheral device operating in a low current consumption mode and a peak current consumption mode which is intermittent over time, the peripheral device drawing a low current in the low current consumption mode which is lower than the current supply limit and drawing a peak current in the peak current consumption mode which is higher than the current supply limit;
- a sensing element configured to sense whether the peripheral device is operating in the low current consumption mode or in the peak current consumption mode;
- an amplifier coupled to the sensing element and configured to receive a signal from the sensing element wherein the signal indicates whether the peripheral device is in the low current consumption mode or in the peak current consumption mode; and
- a switch configured to be coupled with the peripheral device and the host system, the switch configured to direct excess energy from the host system for storage during the low current consumption mode where the low current drawn by the peripheral device is lower than the current supply limit available from the host system, and to allow energy to be drawn from the reservoir to operate the peripheral device in the peak current consumption mode without drawing current from the host system exceeding the current supply limit.

15. The current consumption management system of claim 14 wherein the switch is configured to allow energy to be drawn from the reservoir to operate the peripheral device in the peak current consumption mode only after sufficient energy is stored in the reservoir to supplement the current supply limit available from the host system to meet the peak current of the peripheral device in the peak current consumption mode.

16. The current consumption management system of claim 14 wherein the current supply limit of the host system is one of a peak current supply limit and an average current supply limit.

17. The current consumption management system of claim 14 wherein the current supply limit is a peak current supply limit which is equal to an average current supply limit.

18. The current consumption management system of claim 14 wherein the switch is configured to switch between the low current consumption mode and the peak current consumption mode according to a preset period, and wherein sufficient time is provided in the low current consumption mode to store adequate energy in the reservoir to operate the peripheral device in the peak current consumption mode.

* * * * *